(12) United States Patent
Lee et al.

(10) Patent No.: US 8,828,614 B2
(45) Date of Patent: Sep. 9, 2014

(54) FUEL CELL HYBRID SYSTEM HAVING MULTI-STACK STRUCTURE

(75) Inventors: Nam Woo Lee, Gyeonggi-do (KR); Sang Uk Kwon, Gyeonggi-do (KR); Seong Pil Ryu, Gyeonggi-do (KR); Jae Won Jung, Gyeonggi-do (KR); Sun Soon Park, Gyeonggi-do (KR)

(73) Assignee: Hyundai Motor Corporation, Seoul (KR)

( * ) Notice: Subject to any disclaimer, the term of this patent is extended or adjusted under 35 U.S.C. 154(b) by 1060 days.

(21) Appl. No.: 12/475,671

(22) Filed: Jun. 1, 2009

(65) Prior Publication Data
US 2010/0104894 A1   Apr. 29, 2010

(30) Foreign Application Priority Data

Oct. 28, 2008   (KR) .......................... 10-2008-0106147

(51) Int. Cl.
- *H01M 12/02*   (2006.01)
- *B60W 20/00*   (2006.01)
- *H01M 8/04*   (2006.01)
- *H01M 12/00*   (2006.01)

(52) U.S. Cl.
CPC ............... *H01M 12/00* (2013.01); *Y02E 60/50* (2013.01); *H01M 8/04223* (2013.01); *H01M 8/0488* (2013.01); *H01M 8/04753* (2013.01); *Y02E 60/128* (2013.01)

USPC ........... 429/428; 429/432; 429/443; 429/444; 429/452; 180/65.21; 180/65.29

(58) Field of Classification Search
USPC ................ 429/428–432, 443, 444, 452, 455; 180/65.21, 65.275–65.29, 65.31
See application file for complete search history.

(56) References Cited

U.S. PATENT DOCUMENTS

| | | | |
|---|---|---|---|
| 6,591,924 B2 * | 7/2003 | Shimizu | 180/65.1 |
| 7,147,953 B2 * | 12/2006 | Haltiner et al. | 429/459 |
| 2002/0106537 A1 * | 8/2002 | Saito | 429/13 |
| 2006/0134497 A1 * | 6/2006 | Vinsant | 429/35 |
| 2010/0216045 A1 * | 8/2010 | Ishibashi | 429/446 |

FOREIGN PATENT DOCUMENTS

| | | |
|---|---|---|
| JP | 2000-014030 | 1/2000 |
| JP | 2002-204505 | 7/2002 |
| KR | 10-2008-0003905 | 1/2008 |
| KR | 10-2008-0053864 | 6/2008 |
| WO | WO 2009028340 A1 * | 3/2009 |

* cited by examiner

*Primary Examiner* — Carlos Barcena
(74) *Attorney, Agent, or Firm* — Edward Wildman Palmer LLP; Peter F. Corless

(57) ABSTRACT

The present invention provides a fuel cell hybrid system having a multi-stack structure, which maintains the voltage of a fuel cell at a level lower than that of an electricity storage means (supercapacitor) during regenerative braking so that the fuel cell does not unnecessarily charge the electricity storage means, thereby increasing the amount of recovered energy and improving fuel efficiency.

13 Claims, 4 Drawing Sheets

FUEL CELL HYBRID SYSTEM HAVING MULTI-STACK STRUCTURE

CROSS-REFERENCE TO RELATED APPLICATION

This application claims under 35 U.S.C. §119(a) the benefit of Korean Patent Application No. 10-2008-0106147 filed Oct. 28, 2008, the entire contents of which are incorporated herein by reference.

BACKGROUND (a) Technical Field

The present disclosure relates to a fuel cell hybrid system. More particularly, it relates to a fuel cell hybrid system having a multi-stack structure, which maintains the voltage of a fuel cell at a level lower than that of an electricity storage means (supercapacitor) during regenerative braking so that the fuel cell preferably does not unnecessarily charge the electricity storage means, thereby increasing the amount of recovered energy and improving fuel efficiency.

(b) Background

A fuel cell is an electricity generation system that does not convert chemical energy of fuel into heat by combustion, but electrochemically converts the chemical energy directly into electrical energy in a fuel cell stack. A Fuel cell electricity generation system can be applied to the electric power supply of small-sized electrical and electronic devices, for example portable devices, as well as industrial and household appliances and vehicles.

One of the most widely used fuel cells for a vehicle is a proton exchange membrane fuel cell, or a polymer electrolyte membrane fuel cell (PEMFC), that includes a fuel cell stack comprising a membrane electrode assembly (MEA), a gas diffusion layer (GDL), a gasket, a sealing member, and a bipolar plate. Generally, the MEA includes a polymer electrolyte membrane through which hydrogen ions are transported. An electrode/catalyst layer, in which an electrochemical reaction takes place, is disposed on each of both sides of the polymer electrolyte membrane. The GDL functions to uniformly diffuse reactant gases and transmit generated electricity. The gasket functions to provide an appropriate airtightness to reactant gases and coolant. The sealing member functions to provide an appropriate bonding pressure. The bipolar plate separator functions to support the MEA and GDL, collect and transmit generated electricity, transmit reactant gases, transmit and remove reaction products, and transmit coolant to remove reaction heat, etc.

The fuel cell stack is composed of a plurality of unit cells, each of the unit cells including an anode, a cathode, and an electrolyte (electrolyte membrane). Hydrogen as fuel is supplied to the anode ("fuel electrode", "hydrogen electrode, or "oxidation electrode") and oxygen as oxidant is supplied to the cathode ("air electrode", "oxygen electrode" or "reduction electrode").

The hydrogen supplied to the anode is dissociated into hydrogen ions (protons, $H^+$) and electrons ($e^-$) by a catalyst disposed in the electrode/catalyst layer. The hydrogen ions are transmitted to the cathode through the electrolyte membrane, which is a cation exchange membrane, and the electrons are transmitted to the cathode through the GDL and the bipolar plate.

At the cathode, the hydrogen ions supplied through the (polymer) electrolyte membrane and the electrons transmitted through the bipolar plate react with the oxygen in the air supplied to the cathode to produce water. Migration of the hydrogen ions causes electrons to flow through an external conducting wire, which generates electricity and heat.

In general, fuel cell hybrid vehicles including large vehicles such as buses, as well as small vehicles, have a system equipped with an electricity storage means such as a high voltage battery or a supercapacitor as an auxiliary power source for providing the power required to drive a motor in addition to the fuel cell as a main power source.

At present, a fuel cell-supercapacitor hybrid vehicle which does not employ a power converter has been studied. A fuel cell-supercapacitor hybrid vehicle would preferably have, for example, high fuel efficiency (high regenerative braking, high efficiency of supercapacitor, and without the use of the power converter), an increase in durability of the fuel cell, high reliability control (automatic power assist and automatic regenerative braking function).

Preferably, in the hybrid vehicle in which the fuel cell and the supercapacitor are directly connected, the fuel cell continuously outputs power at a constant level during driving. If there is surplus power, the supercapacitor is charged with the surplus power, whereas, if there is insufficient power, the supercapacitor supplies the insufficient power to drive the vehicle.

The driving modes of the hybrid vehicle including the fuel cell as the main power source and the supercapacitor as the auxiliary power source includes an electric vehicle (EV) mode in which the motor is driven only by the power of the fuel cell, a hybrid electric vehicle (HEV) mode in which the motor is driven by the fuel cell and the supercapacitor at the same time, and a regenerative braking (RB) mode in which the supercapacitor is charged.

The above-described fuel cell-supercapacitor hybrid vehicle has the following problems during regenerative braking.

FIG. 1 is a schematic diagram showing an exemplary configuration of a conventional fuel cell-supercapacitor hybrid system. As shown in the figure, a fuel cell 10 as a main power source is connected in parallel to a supercapacitor 20 as an auxiliary power source to supply electrical energy to a motor 32, and the electrical energy generated by regenerative braking is suitably stored in the supercapacitor 20 through an inverter 31. At this time, the regenerative braking energy is not supplied to the fuel cell 10 by a blocking diode 50 for blocking a reverse current flowing to the fuel cell 10 but recovered to the supercapacitor 20.

The fuel cell-supercapacitor hybrid vehicle has limitations in the regenerative braking since the supercapacitor is automatically charged by the fuel cell. During braking of the vehicle, a considerable amount of regenerative braking energy generated in the driving motor is supplied and stored in the supercapacitor; however, since the fuel cell has no load at this time, the voltage of the fuel cell increases, which results in an increase in electrical energy of the supercapacitor.

The supercapacitor can store a greater amount of regenerative braking energy supplied from the driving motor, if the amount of stored electrical energy is smaller. Therefore, in order for the supercapacitor to store a greater amount of regenerative braking energy, the amount of electrical energy charged in the supercapacitor by the fuel cell should be suitably reduced during regenerative braking, and accordingly it is possible to prevent a decrease in the fuel efficiency.

Accordingly, where the electrical energy supplied from the fuel cell is suitably charged in the supercapacitor, the supercapacitor cannot store a considerable amount of regenerative braking energy, which is an important factor that decreases the fuel efficiency.

The surplus energy, suitably released when the kinetic energy of the vehicle by deceleration is not sufficiently recovered as electrical energy, is consumed as frictional heat in brake pads, which results in a suitable decrease in the durability of various parts of a brake system.

As described above, during the regenerative braking, the fuel cell should not charge the supercapacitor with electrical energy, and, accordingly, the voltage of the fuel cell should be lower than that of the supercapacitor. Since no electrical energy is drawn from the fuel cell during braking of the vehicle, the voltage of the fuel cell is gradually increased to reach an open circuit voltage (OCV) value; further, the electrical energy of the fuel cell is suitably supplied to the supercapacitor until the voltage of the supercapacitor increases. However, if the voltage of the fuel cell is higher than that of the supercapacitor, excessive energy (regenerative energy+ fuel cell energy) is supplied to the supercapacitor, and thereby no more regenerative braking energy is supplied and stored in the supercapacitor.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

In one aspect, the present invention provides a fuel cell hybrid system, which preferably maintains the voltage of a fuel cell at a level suitably lower than that of an electricity storage means (supercapacitor) during regenerative braking so that the fuel cell does not unnecessarily charge the electricity storage means, thereby suitably increasing the amount of recovered energy and improving fuel efficiency.

In one preferred embodiment, the present invention provides a fuel cell hybrid system comprising a fuel cell as a main power source and an electricity storage means as an auxiliary power source, characterized in that the fuel cell preferably has a multi-stack structure in which a plurality of stacks is suitably connected in series, an air supply cutoff means for cutting off air supplied by an air blower to a stack selected from the plurality of stacks is provided on an air supply pipe in front of the corresponding stack, and a controller is provided to suitably control operations of the air supply cutoff means and the air blower.

In a preferred embodiment, during regenerative braking, the controller preferably controls the air supply cutoff means to cut off the air supply to the stack suitably selected from the plurality of stacks, thus stopping generation of electricity by the corresponding stack.

In another preferred embodiment, the controller preferably controls the air supply cutoff means to cut off the air supply to the selected stack and, at the same time, preferably controls the operation of the air blower to provide a necessary amount of air to a stack other than the stack in which the generation of electricity is stopped.

In still another preferred embodiment, the fuel cell has a multi-stack structure in which a first stack and a second stack are suitably connected in series.

In yet another preferred embodiment, the fuel cell has a multi-stack structure in which a first stack having a relatively small number of cells and a second stack having a relatively large number of cells are suitably connected in series, and the air supply cutoff means is provided on an air supply pipe in front of the first stack.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
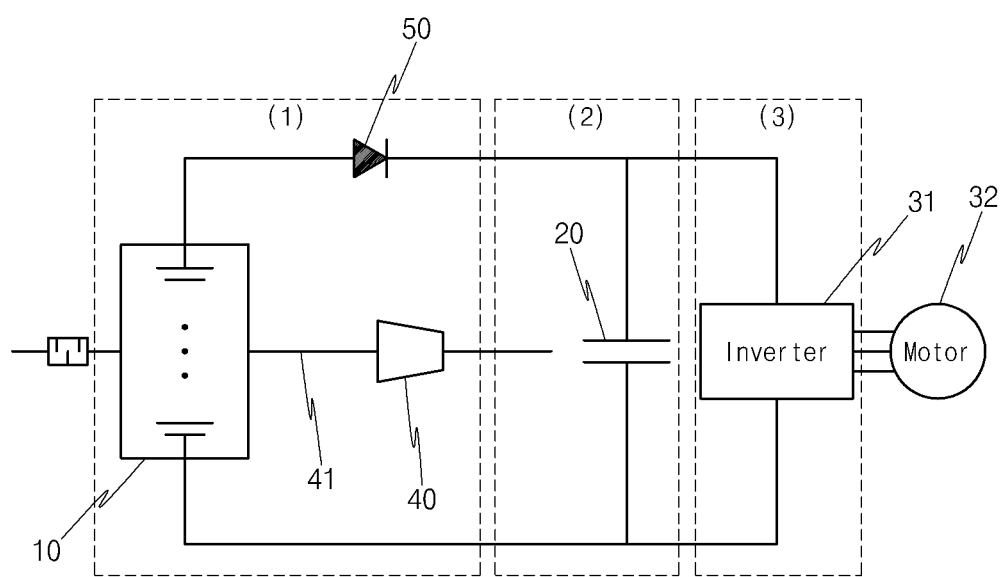
FIG. 1 is a schematic diagram showing a configuration of a conventional fuel cell-supercapacitor hybrid system.

Reference numerals set forth in the Drawings includes reference to the following elements as further discussed below:

| | |
|---|---|
| 10a & 10b: stacks | 20: supercapacitor |
| 31: inverter | 32: motor |
| 40: air blower | 41 & 42: air supply pipe |
| 43: air supply cutoff means | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

As described herein, the present invention includes a fuel cell hybrid system comprising a fuel cell as a main power source and an electricity storage means as an auxiliary power source, characterized in that the fuel cell has a multi-stack structure comprising a plurality of stacks, an air supply cutoff means, and a controller.

In one embodiment, the plurality of stacks are connected in series.

In another embodiment, the air supply cutoff means cuts off air supplied by an air blower to a stack selected from the plurality of stacks. In a related embodiment, the air supply cutoff means is provided on an air supply pipe in front of a corresponding stack selected from the plurality of stacks. In another related embodiment, the plurality of stacks comprises a first stack having a relatively small number of cells and a second stack having a relatively large number of cells.

In another embodiment, the controller controls operations of the air supply cutoff means and the air blower.

The invention also features a motor vehicle comprising the fuel cell hybrid system as described in any of the aspects or embodiments herein.

Hereinafter reference will be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Described herein is a fuel cell-supercapacitor hybrid system that is illustrated by way of an example. It will be readily understood by those skilled in the art that the supercapacitor one preferred example of an electricity storage means. Moreover, it will be readily understood by those skilled in the art that the technical idea of the present invention can be widely applied to many examples of fuel cell-electricity storage means hybrid systems including, but not limited to, a hybrid system employing a supercapacitor.

Figure 2:
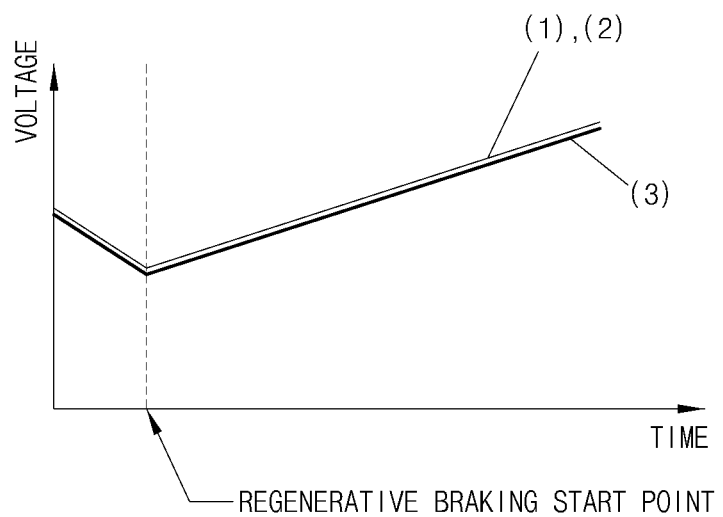
FIG. 2 is a graph showing the voltage behavior during regenerative braking in the conventional fuel cell-supercapacitor hybrid system of FIG. 1.

FIG. 2 is a graph showing the voltage behavior during regenerative braking in the conventional fuel cell-supercapacitor hybrid system shown in FIG. 1. As shown in FIG. 2, when the entire region of the fuel cell-supercapacitor hybrid system is divided into Region 1, Region 2, and Region 3, the voltage of Region 1 corresponds to the voltage of the fuel cell, and the voltage of Region 2 corresponds to the voltage of the supercapacitor. In the configuration of FIG. 1, energy generated in the motor 32 during regenerative braking is suitably supplied to Region 2 through the inverter 31 and, at the same time, the voltage of the fuel cell having no load starts to reach the OCV value.

Accordingly, the electrical energy supplied to Region 2 through the inverter 31, i.e., the regenerative braking energy, is suitably charged in the supercapacitor 20 having the lowest voltage. Simultaneously, the fuel cell 10 having the voltage reaching the OCV value charges the supercapacitor 20 through Region 2. Accordingly, this can be considered a drawback of the conventional system.

Because this process occurs during the process of braking, it is unnecessary to use hydrogen as fuel; however, hydrogen is used anyway. The hydrogen is wastefully consumed in the fuel cell 10 to charge the supercapacitor 20. Moreover, since the fuel cell 10 is charging the supercapacitor 20, the supercapacitor 20 is rapidly charged, and as a result, the supercapacitor 20 cannot store that much regenerative braking energy supplied through the inverter 31.

Accordingly, during regenerative braking, when the voltage of Region 1 is lower than that of Region 2, a maximum amount of regenerative energy generated from the motor 32 can be suitably stored in the supercapacitor 20, and it is possible to prevent hydrogen from being wasted by the fuel cell 10 that unnecessarily charges the supercapacitor 20.

However, in the conventional system as shown in FIG. 1, it is impossible to prevent the fuel cell 10 from charging the supercapacitor 20 during regenerative braking. Referring to FIG. 2, there is little difference in the voltage of Region 1, Region 2, and Region 3; however, the voltage is maintained in the order of "Region 1≥Region 2>Region 3".

To address these aspects of the conventional system, the present invention provides a fuel cell hybrid system in which the fuel cell has an improved multi-stack structure to maximize the regenerative braking energy.

Figure 3:
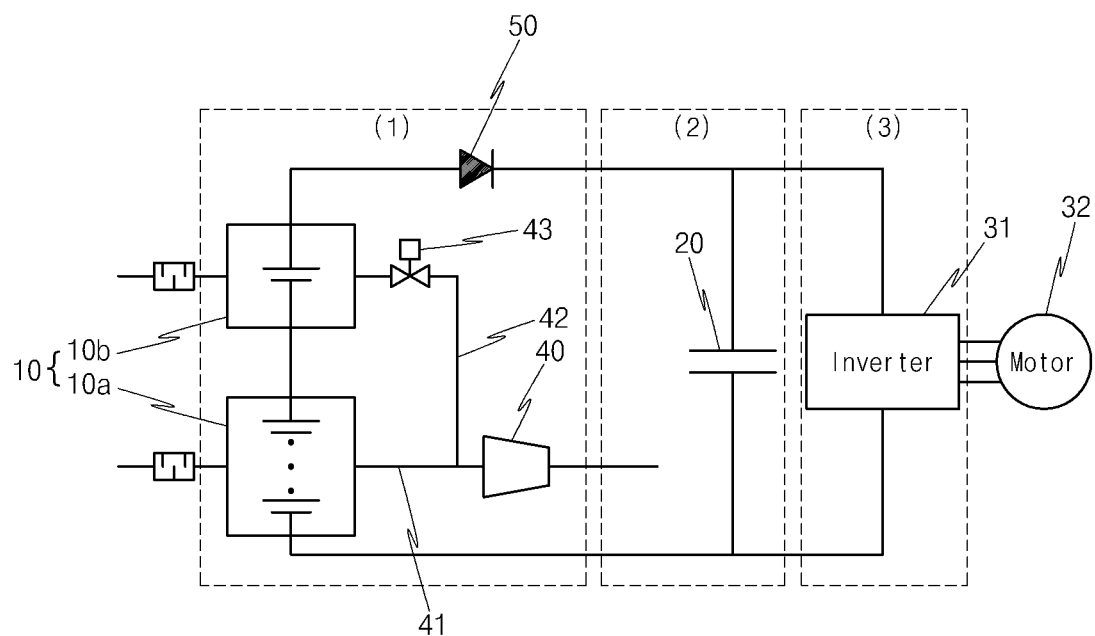
FIG. 3 is a schematic diagram showing a configuration of a fuel cell-supercapacitor hybrid system in accordance with an exemplary embodiment of the present invention.
Figure 4:
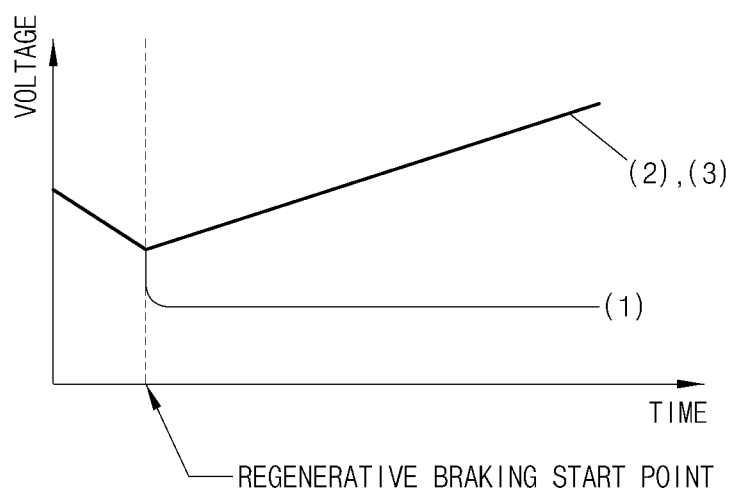
FIG. 4 is a graph showing the voltage behavior during regenerative braking in the fuel cell-supercapacitor hybrid system of FIG. 3 in accordance with the present invention.

FIG. 3 is a schematic diagram showing a configuration of a fuel cell-supercapacitor hybrid system in accordance with an exemplary embodiment of the present invention, and FIG. 4 is a graph showing the voltage behavior during regenerative braking in the fuel cell-supercapacitor hybrid system of FIG. 3 in accordance with further preferred embodiments of the present invention.

As shown in FIG. 3, the hybrid system in accordance certain preferred embodiments of the present invention has a multi-stack structure in which a plurality of stacks 10a and 10b is suitably connected in series. Moreover, the number of cells of each of the stacks 10a and 10b is appropriately adjusted.

Preferably, the fuel cell stack is divided into a plurality of stacks 10 and 10 suitably connected in series and, for example, in preferred embodiments, the fuel cell 10 comprises two stacks 10a and 10b, for example as shown in the embodiment of FIG. 3. In this case, the fuel cell 10 may preferably comprise a first stack 10 suitably including a relatively small number of cells and a second stack 10a suitably including a relatively large number of cells.

In preferred embodiments, in the fuel cell comprising the plurality of stacks 10a and 10b, during electricity generation, the plurality of stacks 10a and 10b is preferably supplied with air from an air blower 40 and generates electrical energy (preferably, hydrogen as fuel is being suitably supplied to the respective stacks). During regenerative braking, the air supply to a stack 10b selected from the plurality of stacks 10a and 10b is suitably cut off (accordingly, a valve of a hydrogen supply system is preferably opened to supply hydrogen), and the air supply to the other stack 10a is maintained so that only the stack 10 supplied with air (and hydrogen) generates electrical energy.

Preferably, an air supply cutoff means 43, which can selectively cut off the air supplied by the air blower 40, is suitably provided on an air supply pipe 42 in front of one stack 10b, in which the air supply is cut off. In further embodiments, when the air supply cutoff means 43 cuts off the air supplied to the first stack 10b through the air supply pipe 42, the operation of the air blower 40 is controlled to provide a necessary amount of air to the other stack 10a.

In exemplary embodiments, for example as shown in FIG. 3, in the case where the fuel cell 10 preferably comprises two stacks 10a and 10b, the air supply cutoff means 43 such as a control valve, which can selectively cut off and resume the air supply, is preferably provided on the air supply pipe 42 in front of the first stack 10b having a smaller number of cells. Further, when the air supply cutoff means 43 cuts off the air supply to the first stack 10b, the operation of the air blower 40 is suitably controlled to provide a necessary amount of air to the second stack 10a having a larger number of cells.

Preferably, the operations of the air blower 40 and the air supply cutoff means 43 are preferably controlled by a controller (not shown). In certain preferred embodiments, during regenerative braking, the controller preferably controls the operation of the air supply cutoff means 43 to cut off the air supplied to the first stack 10b and, at the same time, controls the operation of the air blower 40 to provide a necessary amount of air to the second stack 10a.

In exemplary embodiments, during normal operation, air is preferably supplied to the respective stacks 10a and 10b by the air blower 40 while hydrogen as fuel is being supplied to the respective stack 10a and 10b (the valve of the hydrogen supply system is open), and electrical energy generated from the plurality of stacks connected in series is supplied to the motor 32 or the supercapacitor 20.

During regenerative braking, the air supply cutoff means 43 (e.g., control valve) cuts off the air supplied to the first stack 10b through the air supply pipe 42 under the control of the controller (at this time, hydrogen is continuously supplied), and the operation of the air blower 40 is suitably controlled to provide a necessary amount of air to the second stack 10a.

As a result, according to further embodiments of the invention, the first stack 10b, in which the air supply is cut off, stops the generation of electricity, and thereby the voltage thereof is suitably reduced to 0 V. When the voltage of the first stack 10b is reduced to 0 V, the total voltage of the fuel cell 10 is equal to the voltage of the second stack 10a. Preferably, since the number of cells of each of the first and second stacks 10b and 10a is appropriately adjusted, the voltage of the second stack 10a is suitably lower than that of the supercapacitor 20.

Preferably, since the total voltage of the fuel cell 10 becomes lower than the voltage of the supercapacitor 20, the fuel cell 10 does not suitably charge the supercapacitor 20 even if the voltage of the fuel cell 10 reaches the OCV value as no current is drawn from the fuel cell 10, and thereby all of the electrical energy generated during the regenerative braking is charged in the supercapacitor 20.

FIG. 3 shows that the total voltage of the fuel cell is suitably lower than the voltage of the supercapacitor in a state where the air supply to the first stack 10b is cut off.

As described herein, according to the fuel cell-supercapacitor hybrid system having a multi-stack structure of the present invention, the fuel cell preferably has an improved multi-stack structure in which a plurality of stacks is suitably connected in series, the air supply to a stack selected from the plurality of stacks is preferably cut off to stop the generation of electricity during regenerative braking, the total voltage of the fuel cell is suitably maintained at a level lower than the voltage of the supercapacitor so that the fuel cell does not unnecessarily charge the supercapacitor, and thereby it is possible increase the amount of recovered energy and improve the fuel efficiency.

Preferably, by maximizing the amount of recovered regenerative braking energy, it is possible to prevent the surplus energy from being consumed as frictional heat in brake pads, and thereby it is possible to overcome the decrease in durability of a braking system.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A fuel cell hybrid system comprising:
    a fuel cell configured as a main power source wherein the fuel cell has a multi-stack structure in which a plurality of stacks are connected in series;
    an electricity storage means configured as an auxiliary power source;
    an air supply cutoff valve, wherein the air supply cut-off is disposed within an air supply pipe between the air blower and at least one stack of the plurality of stacks having the least amount of cells therein; and
    a controller configured to control the air supply cutoff valve to cut off air supplied by an air blower to one stack selected from the plurality of stacks during regenerative braking and to open the air supply cut off valve during normal operation so that air is supplied to all of the plurality of stacks,
    wherein the fuel cell is electrically connected to the electricity storage means so that electrical energy generated from the plurality of stacks is supplied to the electricity storage means during normal operation and a total voltage of the fuel cell becomes less than the voltage of the electricity storage means during regenerative braking by cutting off air supply to one of the plurality of stacks of the fuel cell by the air supply cut off valve.

2. The fuel cell hybrid system of claim 1, wherein, during regenerative braking, the controller controls the air supply cutoff valve to cut off the air supply to the stack selected from the plurality of stacks, thus stopping generation of electricity by the corresponding stack.

3. The fuel cell hybrid system of claim 2, wherein the controller controls the air supply cutoff valve to cut off the air supply to the selected stack and, at the same time, controls the operation of the air blower to provide a necessary amount of air to a stack other than the stack in which the generation of electricity is stopped.

4. The fuel cell hybrid system of claim 1, wherein the fuel cell has a multi-stack structure in which a first stack and a second stack are connected in series.

5. The fuel cell hybrid system of claim 4, wherein the fuel cell has a multi-stack structure in which a first stack having a relatively small number of cells and a second stack having a relatively large number of cells are connected in series, and the air supply cutoff valve is provided on an air supply pipe in front of the first stack.

6. A fuel cell hybrid system comprising:
    a fuel cell configured as a main power source wherein the fuel cell has a multi-stack structure having a plurality of stacks; and
    an electricity storage means configured as an auxiliary power source,
    an air supply cutoff valve disposed within an air supply pipe between an air blower and at least one stack of the plurality of stacks having the least amount of cells therein;
    an air supply cutoff means connected to the air supply cut off valve; and
    a controller configured to control the air supply cut off means to cut off air supplied by an air blower to one stack selected from the plurality of stacks during regenerative braking and are opened during normal operation so that air is supplied to all of the plurality of stacks, and
    wherein the fuel cell is electrically connected to the electricity storage means so that electrical energy generated from the plurality of stacks is supplied to the electricity storage means during normal operation and a total voltage of the fuel cell becomes less than the voltage of the electricity storage means during regenerative braking, by cutting off air supply to one of the plurality of stacks of the fuel cell by the air supply cut off valve.

7. The fuel cell hybrid system of claim 6, wherein the plurality of stacks are connected in series.

8. The fuel cell hybrid system of claim 6, wherein the air supply cutoff valve cuts off air supplied by an air blower to a stack selected from the plurality of stacks.

9. The fuel cell hybrid system of claim 6, wherein the air supply cutoff valve is provided on an air supply pipe in front of a corresponding stack selected from the plurality of stacks.

10. The fuel cell hybrid system of claim 6, wherein the controller controls operations of the air supply cutoff valve and the air blower.

11. The fuel cell hybrid system of claim 6, wherein the plurality of stacks comprises a first stack having a relatively small number of cells and a second stack having a relatively large number of cells.

12. A motor vehicle comprising the fuel cell hybrid system of claim 1.

13. A motor vehicle comprising the fuel cell hybrid system of claim 6.

* * * * *